United States Patent
Dunlop et al.

(10) Patent No.: US 7,159,148 B2
(45) Date of Patent: Jan. 2, 2007

(54) METHOD FOR PERFORMANCE AND FAULT MANAGEMENT IN A TELECOMMUNICATION NETWORK

(75) Inventors: Colin G. Dunlop, Mesa, AZ (US); Harry H. Dill, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 756 days.

(21) Appl. No.: 10/167,305

(22) Filed: Jun. 11, 2002

(65) Prior Publication Data

US 2003/0229818 A1    Dec. 11, 2003

(51) Int. Cl.
*G06F 11/00*    (2006.01)

(52) U.S. Cl. .......................... 714/43; 714/48
(58) Field of Classification Search ............... 714/43, 714/48
See application file for complete search history.

(56) References Cited

U.S. PATENT DOCUMENTS

| | | | |
|---|---|---|---|
| 5,953,389 A * | 9/1999 | Pruett et al. .................. 379/9 |
| 6,256,753 B1 * | 7/2001 | Williams ...................... 714/47 |
| 6,310,911 B1 * | 10/2001 | Burke et al. ................. 375/224 |
| 6,360,335 B1 * | 3/2002 | Dawson ........................ 714/39 |
| 6,446,222 B1 * | 9/2002 | Phaal ........................... 714/43 |
| 6,515,970 B1 * | 2/2003 | Lindsay et al. ............. 370/280 |
| 6,564,342 B1 * | 5/2003 | Landan ......................... 714/48 |
| 6,581,166 B1 * | 6/2003 | Hirst et al. ..................... 714/4 |
| 6,598,229 B1 * | 7/2003 | Smyth et al. ................ 725/107 |
| 6,771,964 B1 * | 8/2004 | Einola et al. ............... 455/437 |
| 2003/0115508 A1 * | 6/2003 | Ali et al. ....................... 714/43 |
| 2004/0146039 A1 * | 7/2004 | Soininen et al. ............. 370/349 |

OTHER PUBLICATIONS

IBM TDB "Self Defining Encodings for Network Management Statistics" Nov. 1989, vol. 32, Issue 6B, pp. 124-129.*
Kueh, V.Y.H et al. "Performance of VoIP Call Set-up Over Satellite-UMTS Using Session Initiation Protocol" date unknown.*
Pang, Ai-Chun "A Study on SIP Session Timer for Wireless VoIP" IEEE 2005.*

* cited by examiner

*Primary Examiner*—Bryce P. Bonzo
(74) *Attorney, Agent, or Firm*—Frank J. Bogacz; Kevin D. Wills

(57) ABSTRACT

A mobile subscriber (20) initiates a request for packet data services (100). As the request is processed from network node (40) to network node (50), the transmission is checked for errors (104). For successive failures, exceeding a threshold (108), an alarm condition along with a cause code corresponding to the particular network node is sent to a network system manager (114).

18 Claims, 2 Drawing Sheets

METHOD FOR PERFORMANCE AND FAULT MANAGEMENT IN A TELECOMMUNICATION NETWORK

BACKGROUND OF THE INVENTION

The present invention pertains to communication systems and more particularly to a method for performance and fault management for a wireless telecommunications network.

Today mobile telecommunication networks are complex wireless systems. These mobile telecommunication networks generally provide very little data to a Network Management System for use by performance and fault management applications. This is in stark contrast to the amount of data generated by a telecommunication network node when coordinating call setup, call maintenance and call teardown activities with adjacent nodes.

Existing fault management systems correlate alarms and failures in software applications based on certain physical conditions of the telecommunication network. The objective of this correlation is to derive the nature and location of a fault or failure so repairs can be completed in an expeditious manner. This type of correlation requires an accurate definition of the relationships between failures and event notifications. Currently these relationships are identified through observation of the operational system and therefore cannot be defined until the operational characteristics of the deployed system are understood. As a result, a newly deployed mobile telecommunication network has poor fault management performance. This means there is further cost and time associated with deploying the new mobile network since many observations and behaviors must be made before the network can be efficiently run and maintained. In addition, the relationships between event notifications and failures are unique to a given physical network. There is no opportunity for cost savings through reuse of event notification/failure relationships.

Accordingly, what is needed is a robust fault management and system performance methodology available immediately when a mobile telecommunication system is put in service.

DESCRIPTION OF THE PREFERRED EMBODIMENT

The basis of this invention is the use of the operational call management data that is normally confined to adjacent network nodes for performance and fault management purposes.

Figure 1:
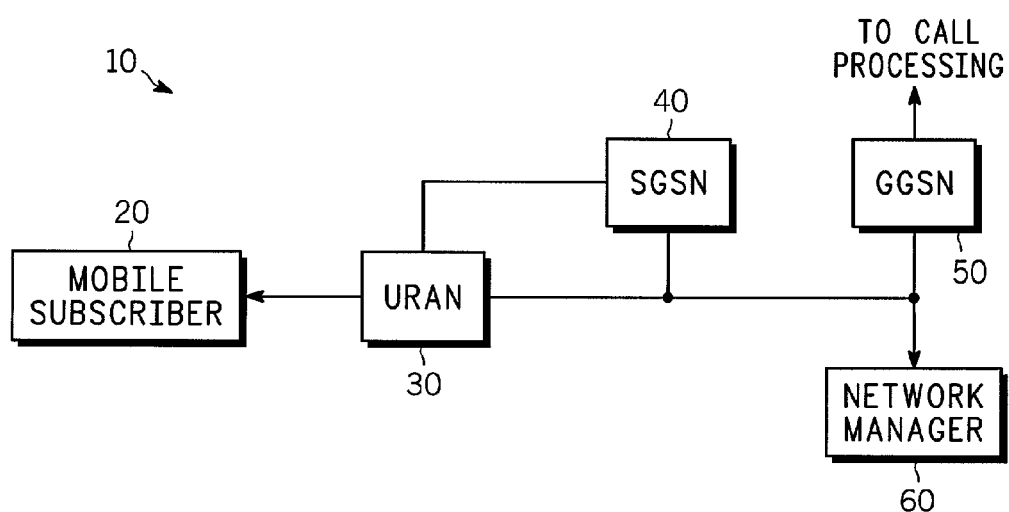
FIG. 1 is a block diagram of a mobile telecommunication network in accordance with the present invention.

FIG. 1 is a block diagram of a portion of a mobile telecommunication network 10. A mobile subscriber 20 is coupled to the URAN (UMTS Radio Access Network) 30. Mobile subscriber 20 makes a session initiation protocol (SIP) request through URAN 30 to the Serving GPRS Support Node (SGSN) 40. SGSN 40 in turn transmits a PDP context activation request to the Gateway GPRS Support Node (GGSN) 50. The GGSN 50 transmits the request through the rest of the call processing network (not shown). All the network nodes such as SGSN 40 and GGSN 50 are coupled to the network manager 60.

In the modern telecommunication networks cause codes exist. These cause codes are transmitted between network nodes whenever one node requests an action from a second node and the second node fails to complete the requested action. A cause code indicates a specific reason an action failed to complete. When the number of occurrences of a cause code exceeds a predetermined threshold number of occurrences in any of the system nodes such as SGSN 40 or GGSN 50, a message identifying the code and the node is transmitted to network manager 60. By collecting, aggregating and analyzing the cause codes it can be determined where the failure of packet transmission has occurred.

Figure 2:
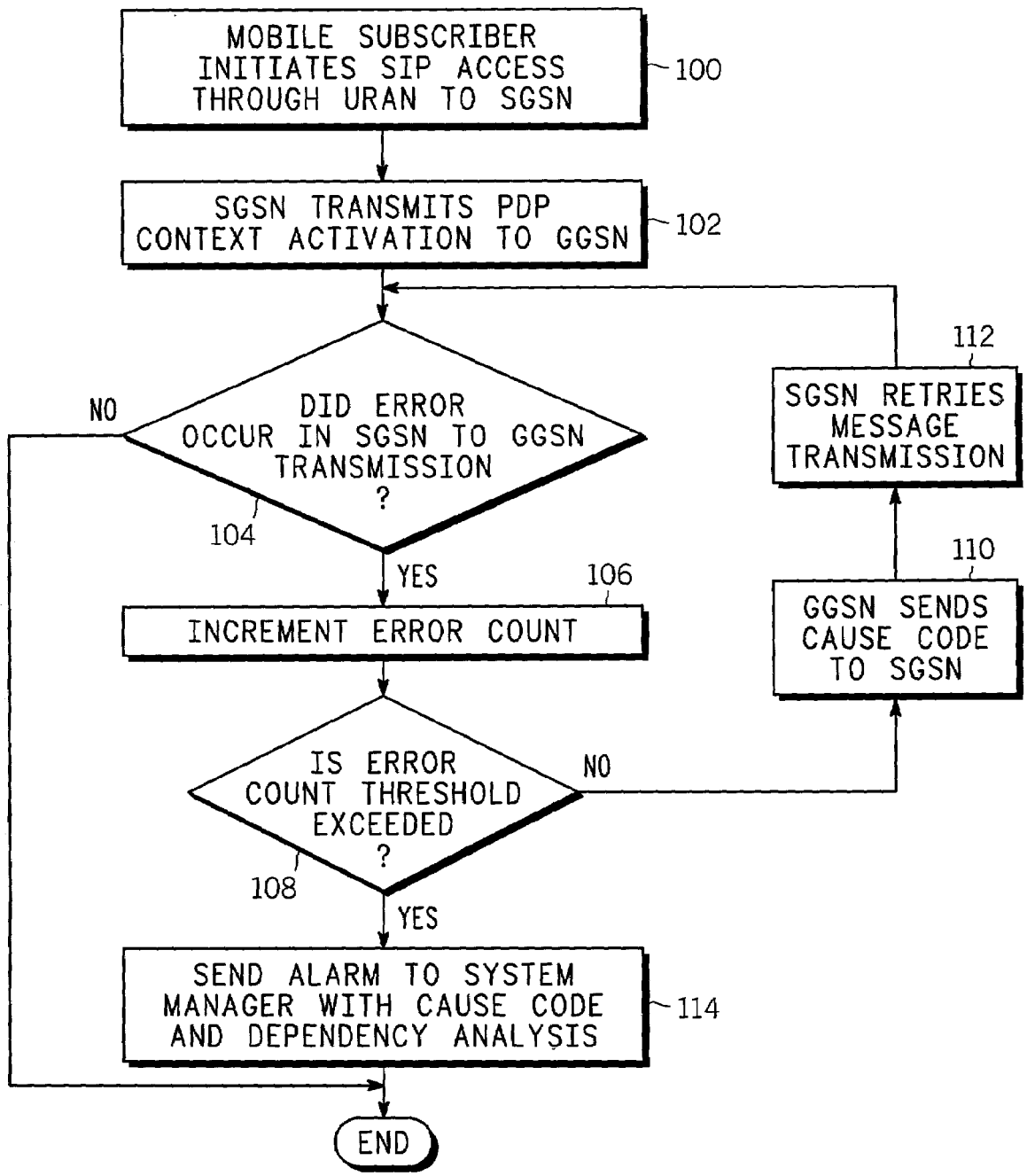
FIG. 2 is a flow chart of a method for fault management system performance in accordance with the present invention.

Referring now to FIG. 2, a flow chart of the method for fault management is shown. Although this example addresses the SIP and PDP protocols, this methodology is applicable to any protocol that incorporates cause codes. The mobile subscriber initiates an SIP access through URAN 30 to SGSN 40, block 100. Next, the SGSN transmits a PDP context activation to the GGSN, block 102. If the SGSN is unable to complete the action of sending a PDP context activation to the GGSN, it sends a notification containing a cause code back to the mobile subscriber. These are routine URAN and SGSN activities in accordance with current protocols. In accordance with this invention, the SGSN increments a count of the number of times that that specific cause code has been sent. If the number of occurrences of that cause code exceeds a predefined threshold, the SGSN notifies the network manager 60.

GGSN then determines whether an error occurred in the transmission from SGSN to the GGSN, block 104. If no error occurred, block 104 transfers control to end this method. There was no error in transmission needing fault analysis.

If an error did occur, block 104 transfers control to block 106. If an error occurred, the GGSN sends a message including a cause code to the SGSN in accordance with current protocols. In accordance with this invention, the GGSN increments a count of the number of times that that specific cause code has been sent, block 106. If the number of occurrences of that cause code exceeds a predefined threshold block 108, the GGSN notifies the network manager block 114. If the error count has not exceeded the threshold, block 108 transfers control to block 110 via the NO path.

The GGSN sends the message containing the cause code to SGSN, block 110. The SGSN then retries the message transmission transferring control back to block 104 for error checking on subsequent retries.

Lastly, the network manager 60 will correlate the cause code for the number of times the threshold is exceeded for fault detection and isolation purposes. Suitable reports may be printed or transmitted to the network operations manager to affect repairs.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:
1. A method for network fault management in a UMTS radio access network, comprising the steps of:
   initiating by a subscriber a session request to a network via a Session Initiation Protocol (SIP),;

determining by a first network node whether an error occurred in transmission of the session request to a second network node;

determining whether an error count exceeded a predetermined threshold; and if the error count exceeded the predetermined threshold, sending cause codes to a network manager.

2. The method for network fault management as claimed in claim 1, wherein the step of sending cause codes to a network manager includes the step of sending an alarm indication to the network manager.

3. The method for network fault management as claimed in claim 1, wherein there is further included a step of incrementing the error count by the first network node.

4. The method for network fault management as claimed in claim 1, wherein there is further included a step of incrementing the error count for the second network node.

5. The method for network fault management as claimed in claim 1, wherein there is further included a step of converting the session request to a packet data protocol context activation.

6. The method for network fault management as claimed in claim 5, wherein there is further included a step of transmitting the packet data protocol context activation from the first network node to the second network node.

7. The method for network fault management as claimed in claim 1, wherein if the error count does not exceed the predetermined threshold, there is included a step of sending by the second network node the cause codes to the first network node.

8. The method for network fault management as claimed in claim 7, wherein if the error count is not greater than the predetermined threshold, then retrying the transmission from the first network node to the second network node.

9. A method for utilizing network cause codes in a UMTS radio access network, comprising the steps of:

sending a packet data protocol (PDP) context activation request via a Session Initiation Protocol (SIP) from a first network node to a second network node;

determining by the second network node whether the PDP context activation request was successfully transmitted from the first network node; and if the step of detennining is unsuccessful, sending network cause codes to a network manager.

10. The method for utilizing network cause codes as claimed in claim 9, wherein the step of determining further includes the step of incrementing an error count for an unsuccessful PDP context activation request transmission between the first network node and the second network node.

11. The method for utilizing network cause codes as claimed in claim 10, wherein the step of determining further includes the step of determining whether a value of the error count exceeds a predetermined threshold.

12. The method for utilizing network cause codes as claimed in claim 11, wherein if the error count exceeded the predetermined threshold, then the step of sending includes the step of sending an alarm and the network cause codes to the network manager.

13. The method for utilizing network cause codes as claimed in claim 12, wherein if the error count does not exceed the predetermined threshold, then there is further included the step of sending by the second network node the network cause codes to the first network node.

14. The method for utilizing network cause codes as claimed in claim 13, wherein if the error count does not exceed the predetermined threshold, then there is further included a step of retrying the step of sending the packet data protocol context activation request from the first network node to the second network node.

15. A method for network fault management in a UMTS radio access network, comprising the steps of assigning a unique cause code to each network node of a plurality of network nodes;

sending a packet data protocol (PDP) context activation request via a Session Initiation Protocol (SIP) from a first network node to a second network node;

determining by the second network node whether the PDP context activation request was successfully transmitted from the first network node; and if the step of determining is unsuccessful, sending network cause codes to a network manager.

16. The method for utilizing network cause codes as claimed in claim 15, wherein the step of detennining further includes the step of incrementing an error count for an unsuccessful PDP context activation request transmission between the first network node and the second network node.

17. The method for utilizing network cause codes as claimed in claim 16, wherein the step of determining further includes the step of determining whether a value of the error count exceeds a predetermined threshold.

18. The method for utilizing network cause codes as claimed in claim 17, wherein if the error count does not exceed the predetermined threshold, then there is further included a step of retrying the step of sending the packet data protocol context activation request from the first network node to the second network node.

* * * * *

UNITED STATES PATENT AND TRADEMARK OFFICE
CERTIFICATE OF CORRECTION

PATENT NO. : 7,159,148 B2 Page 1 of 1
APPLICATION NO. : 10/167305
DATED : January 2, 2007
INVENTOR(S) : Colin G. Dunlop and Harry H. Dill It is certified that error appears in the above-identified patent and that said Letters Patent is hereby corrected as shown below:

In claim 16, column 4, line 34, delete "detennining" and insert --determining--.

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,159,148 B2 Page 1 of 1
APPLICATION NO. : 10/167305
DATED : January 2, 2007
INVENTOR(S) : Colin G. Dunlop and Harry H. Dill It is certified that error appears in the above-identified patent and that said Letters Patent is hereby corrected as shown below:

In claim 16, column 4, line 34, delete "detennining" and insert --determining--.

Signed and Sealed this

Third Day of April, 2007

JON W. DUDAS
*Director of the United States Patent and Trademark Office*